United States Patent [19]

Urban

[11] 3,737,517
[45] June 5, 1973

[54] METHOD FOR REDUCING OXYSULFUR COMPOUNDS

[75] Inventor: Peter Urban, Northbrook, Ill.

[73] Assignee: Universal Oil Products Company, Des Plaines, Ill.

[22] Filed: Feb. 8, 1971

[21] Appl. No.: 113,722

[52] U.S. Cl. .................. 423/560, 423/561, 423/566
[51] Int. Cl. ....... C01b 17/20, C01b 17/28, C01c 1/20
[58] Field of Search ........................... 23/137, 134; 423/560, 561, 566

[56] References Cited

UNITED STATES PATENTS

| | | | |
|---|---|---|---|
| 1,045,769 | 11/1912 | Bollo et al. | 23/137 |
| 1,636,106 | 7/1927 | Naef | 23/137 |
| 1,916,803 | 7/1933 | Ley et al. | 23/137 |
| 2,093,504 | 9/1937 | Zirngibl | 23/137 |
| 3,558,272 | 1/1971 | Urban | 23/137 |

*Primary Examiner*—Edward Stern
*Attorney*—James R. Hoatson, Jr. and Thomas K. McBride

[57] ABSTRACT

Inorganic, water-soluble oxysulfur compounds are reduced by contacting an aqueous solution of the oxysulfur compound and hydrogen with a bimetallic catalyst at reduction conditions. The bimetallic catalyst comprises catalytically effective amounts of a metallic sulfide selected from sulfides of the transition metals from group VI and of a metallic sulfide selected from the sulfides of the transition metals of group VIII combined with a porous carrier material. A specific example of the disclosed invention is a method for reducing an inorganic, water-soluble thiosulfate compound to a sulfide compound by contacting an aqueous solution of the thiosulfate compound and hydrogen, at reduction conditions, with a catalyst comprising a combination of catalytically effective amounts of molybdenum sulfide and of cobalt sulfide with a porous carrier material.

23 Claims, No Drawings

METHOD FOR REDUCING OXYSULFUR COMPOUNDS

The subject of the present invention is a method for the catalytic conversion of an inorganic, water soluble oxysulfur compound to a sulfur-containing compound which has its sulfur component in a lower valance state than the oxysulfur compound — primarily the conversion of the oxysulfur compound to the corresponding sulfide compound. More specifically, the present invention relates to a novel catalytic method which utilizes controlled amounts of hydrogen in conjunction with a special bimetallic catalyst to effect selective reduction of the oxidation state of the sulfur component of the oxysulfur compound. The bimetallic catalyst utilized in this method essentially comprises catalytically effective amounts of a metallic sulfide component, selected from the sulfides of the transition metals of group VI, and of a metallic sulfide component, selected from the sulfides of the transition metals of group VIII, combined with a porous carrier material. In one aspect the present invention involves a method for the selective, catalytic reduction of a water-soluble, inorganic sulfite compound to the corresponding sulfide compound. In another important aspect the present invention is a selective, catalytic method for selectively reducing a water-soluble thiosulfate compound to the corresponding sulfide compound. In a more limited aspect, the present invention relates to a method for reducing a water-soluble thiosulfate compound to the corresponding sulfide compound using hydrogen as the reducing agent and a catalyst comprising catalytically effective amounts of cobalt sulfide and molybdenum sulfide combined with a suitable porous carrier material.

As part of the price that has to be paid for a modern industrial society, aqueous solutions of oxysulfur compounds are produced as major products or by-products of a number of significant industrial activities. By use of the term "105 oxysulfur compounds," it is intended to cover all common water-soluble compounds of sulfur and oxygen which are typically found in industrial waste or process streams, such as sulfuric acid, sulfurous acid and water-soluble salts thereof, thiosulfuric acid and water-soluble salts thereof and the polythionic acids ($(H_2S_nO_6)$ wherein $n$ may have any value from 2 to 6 inclusive) and water soluble salts thereof. These aqueous solutions of oxysulfur compounds are quite prevelant in modern industry primarily because of the widespread utilization of sulfur as a basic reactant or ingredient in many chemical processes and because of the presence of substantial quantities of sulfur in various forms in the fuel used to generate the major portion of energy consumed in a modern industrial economy. The electrical utility industry is, for example, currently faced with a major pollution problem caused by the widespread practice of burning coal and fuel oil containing significant amounts of sulfur in its power stations. During the course of the combustion of the sulfur-containing fuel, the sulfur is converted to oxides of sulfur, primarily sulfur dioxide, with attendant production of a flue or stack gas stream containing substantial amounts of sulfur oxides. Removal of these sulfur oxides from this flue gas, by means of conventional scrubbing processes with aqueous absorbents, quite commonly results in an aqueous stream containing significant amounts of water-soluble oxysulfur compounds, primarily they are water-soluble sulfite compounds. Likewise aqueous stream containing oxysulfur compounds can be produced by wet scrubbing $SO_2$-containing waste gas streams produced in other industrial activities such as the smelting of sulfur-bearing ores, the refining of sulfur-containing crude oils, the synthesis of sulfuric acid, the sulfonation of hydrocarbons, the production of coke, the production of sulfur in a Claus unit, the production of paper via a wood-pulping process and the like industrial processes.

Aqueous solutions containing water-soluble, inorganic thiosulfate compounds are commonly available as undesired side or drag streams from many economically significant industrial processes in the chemical, petroleum and steel industries. For instance, in the petroleum industry, an aqueous solution containing ammonium thiosulfate is commonly produced as a drag stream from sulfur recovery systems that employ an oxidation technique. These sulfur recover systems are usually designed to enable the recovery of elemental sulfur from ammonium hydrosulfide solutions which are byproducts of such typical refinery processes as hydrorefining, hydrocracking, catalytic cracking and the like. See for example the sulfur recovery systems disclosed in U.S. Pat. Nos. 3,536,619; 3,536,618; 3,531,395 and 3,530,063.

Another common source for thiosulfate- containing aqueous solutions is found in connection with scrubbing processes designed to sweeten natural gas to purify coal gas or town gas and the like processes to cleanup refinery gas streams where hydrogen sulfide is scrubbed from a gaseous mixture with an aqueous absorbent to produce a rich absorbent stream which is thereafter regenerated with oxygen. For example in the Seaboard process, where the absorbent is an aqueous solution of sodium carbonate and the regeneration step essentially involves stripping the absorbed hydrogen sulfide from the rich absorbent solution with large quantities of air, the air used in this regeneration step tends to oxidize some of the absorbed hydrogen sulfide to sodium thiosulfate which causes a build-up of thiosulfate in the absorbent solution. This thiosulfate by-product production problem is commonly handled by periodically or continuously withdrawing a drag stream from the process containing sodium thiosulfate and adding a fresh alkaline reagent. Similar problems of thiosulfate by-product formation are also found in other $H_2S$ scrubbing processes that employ oxygen to regenerate the rich absorbent regeneration step such as in the Ferrox Process, the Thylox Process, the Perox Process and the Nickel Process. In all of these wet $H_2S$ scrubbing processes an inevitable side reaction appears to be one leading to the formation of water-soluble thiosulfate salt by-products, which then accumulate in the scrubbing solution until these pressures become detrimental. The net amount of the thiosulfate by-product being produced must, therefore, be continuously or periodically purged from the scrubbing system by discarding a drag stream containing a water-soluble thiosulfate compound.

Regardless of the source of the aqueous stream containing oxysulfur compounds, it is clear that there is a substantial need for an effective and simple method for treating these types of solutions in order to remove the oxysulfur compound therefrom and allow either reuse of the resulting treated aqueous solution in the process which produced it or to enable the discharge of the water stream into sewers, rivers or streams without causing any substantial pollution problem. The first alternative is particularly attractive when the sulfoxide-containing solution also contains other valuable reagents such as the Thylox process wherein the drag stream which is withdrawn from the process in order to purge the undesired thiosulfate by-product, also contains sodium carbonate and arsenic trioxide. In addition, the glowing sensitivity of the public to the numerous adverse effect of indiscriminate discharge of gaseous and aqueous waste streams containing oxysulfur compounds provides an additional incentive for treating these oxysulfur compound-containing aqueous solutions in order to remove the detrimental sulfur-containing compounds prior to the discharge of the solutions into conventional sewage facilities.

In one specific case of particular interest, hydrorefining or hydrocracking of petroleum distillates containing nitrogenous and sulfurous contaminants, large quantities of ammonium and hydrogen sulfide are present in the effluent stream from the reaction zone, and these contaminants are generally absorbed in an aqueous solution which is injected into the effluent train of cooling means and separating zones associated with the hydrocarbon conversion process. This results in an aqueous waste stream containing ammonium hydrosulfide ($NH_4HS$) which can thereafter be subjected to a catalytic oxidation step in order to recover sulfur therefrom or to reduce the biological oxygen demand thereof. Despite stringent precautions, a minor amount of thiosulfate salt (i.e. $(NH_4)_2 S_2O_3$) is inevitably formed as a side product in this catalytic oxidation step. The resulting ammonium thiosulfate-containing aqueous solution withdrawn as effluent from this oxidation step cannot ordinarily be reused to recover an additional portion of ammonium hydrosulfide because, if it is injected into the effluent train associated with the hydrorefining of hydrocracking process, the hydrogen sulfide and/or ammonium hydrosulfide present in the effluent from the reaction zone can react with the ammonium thiosulfate to produce free sulfur which can contaminate the hydrocarbon product from this hydrocarbon conversion process leading to severe corrosion problems in down-stream equipment. There is thus a substantial need for a method of efficiently and conveniently treating an aqueous solution containing ammonium thiosulfate in order to allow reuse of the aqueous stream within the hydrocarbon conversion process to absorb additional quantities of hydrogen sulfide.

Another specific case of particular interest involves the wet-scrubbing of sulfur dioxide from $SO_2$-containing gas streams, which are produced by the combustion of sulfur-containing fuels, the smelting of sulfur-containing ores and the like industrial activities (as explained hereinbefore) to produce a rich aqueous absorbent stream containing salts of sulfurous acid. A common procedure involves the use of an absorbent which essentially is a solution of a relatively inexpensive alkaline reagent such as the hydroxide and carbonate compounds of ammonia, the alkali metals and the alkaline earth metals. After this solution is used to absorb $SO_2$ from flue gas, a rich absorbent stream containing the corresponding sulfite compound— for example, ammonium sulfite and/or bisulfite and the like compounds— is obtained. I have recently discovered a novel procedure for treating this type of sulfite-containing aqueous solution which minimizes the amount of undesired, intractable sulfate compounds formed during the regeneration step on this absorbent solution. This treatment procedure essentially involves the production of an aqueous stream containing a water-soluble, inorganic thiosulfate compound as an intermediate in the regeneration operation. Both the sulfite-containing aqueous stream withdrawn from the $SO_2$-scrubber and the thiosulfate-containing stream produced in accordance with my recently developed procedure are aqueous solutions containing oxysulfur compounds which require additional treatment in order to regenerate the scrubbing solution so that it can be recycled to the $SO_2$-scrubbing step. Thus, in this specific embodiment, there is also a need for a treatment procedure which can efficiently and conveniently operate on these types of oxysulfur-containing solutions in order to regenerate the aqueous scrubbing solution.

The problem addressed by the present invention is, therefore, to provide a method for efficiently, economically and conveniently treating an oxysulfur-containing solution in order to convert the oxysulfur compound contained therein to a species which can easily be removed from the resulting treated solution.

I have now found a procedure for converting these water-soluble oxysulfur compounds into the corresponding sulfide compound in a highly selective manner. The resulting sulfide compound can then be easily removed from the resulting treated solution by a conventional procedure for liberating a sulfide compound from an aqueous solution such as by adding a relatively strong acid (i. e. stronger than $H_2S$) in an amount sufficient to lower the pH to the point where hydrogen sulfide is liberated or by a conventional $H_2S$-stripping step. In some cases, the sulfide-containing treated aqueous stream produced by the method of the present invention may be useful per se or may be directly charged to a process for converting aqueous solutions of sulfide to elemental sulfur such as the process described in my U.S. Pat. No. 3,034,865.

The basic concept of the method of the present invention emanated from my efforts to develop a more active and selective catalyst for the reduction of aqueous solutions of oxysulfur compounds with hydrogen. During the course of these investigations I discerned that a synergistic effect could be obtained in this reaction if a special bimetallic catalyst was utilized. My finding here was essentially that a bimetallic catalyst, comprising catalytically effective amounts of a first metallic sulfide component selected from the transition metals from group VI of the Periodic Table and a second metallic sulfide component selected from the sulfides of the transition metals of group VIII of the Periodic Table combined with a porous carrier material, accelerates this reduction reaction in a manner sharply superior to that observed when the catalyst utilized only contains one of these metallic sulfide components. In other words, I have determined that a catalyst containing both of these metallic sulfide components is materially more active and selective than a catalyst containing only one of them in promoting the selective reduction of oxysulfur compounds to the corresponding sulfide compounds in an aqueous solution when hydrogen is used as the reducing agent. For example I have ascertained that a catalyst, comprising catalytically effective amounts of molybdenum sulfide and cobalt sulfide combined with an activated carbon carrier material, is sharply superior to a catalyst containing only one of these sulfides in accelerating a reaction between an aqueous solution of sodium thiosulfate and hydrogen to produce sodium hydrosulfide.

It is, accordingly, an object of the present invention to provide an improved method for catalytically reducing an inorganic water-soluble oxysulfur compound with hydrogen to a sulfide compound. Another object is to provide a very active bimetallic catalyst which is uniquely capable of accelerating the reaction between an aqueous solution of oxysulfur compounds and hydrogen to selectively produce sulfide. Yet another object is to provide a bimetallic catalyst for this oxysulfur compound reduction reaction which enables the selective production of sulfide at relatively mild conditions of temperature and pressure.

In brief summary, a broad embodiment of my invention involves a method for reducing an inorganic, water-soluble oxysulfur compound to a sulfide compound. This method essentially comprises contacting an aqueous solution of the oxysulfur compound and hydrogen with a bimetallic catalyst at reduction conditions. The bimetallic catalyst utilized comprises a combination of catalytically effective amounts of a group VIB metallic sulfide component, and of a group VIII metallic sulfide component with a porous carrier material.

Another embodiment of the present invention involves a process as outlined above wherein said oxysulfur compound is a water-soluble, inorganic sulfite compound.

Another embodiment involves the method first outlined above wherein the oxysulfur compound is a water-soluble, inorganic thiosulfate compound.

In a more limited embodiment, the present invention is a method for reducing an inorganic, water-soluble thiosulfate compound to a sulfide compound. The method essentially involves contacting an aqueous solution of the thiosulfate compound and hydrogen with a catalyst, comprising a combination of catalytically effective amounts of molybdenum sulfide and of cobalt sulfide with a porous carrier material, at reduction conditions. Moreover, hydrogen is preferably utilized in an amount selected to correspond to a mole ratio of hydrogen to thiosulfate compound contained in the solution of about 40:1, and the reduction conditions preferably include a temperature of about 50° to about 350° C. and a pressure at least sufficient to maintain a portion of the aqueous solution in the liquid phase.

In another limited embodiment, the present invention is a method as outlined above in the last embodiment where the catalyst utilized comprises a combination of a cobalt sulfide component and of a molybdenum sulfide component with a carbonaceous carrier material in amounts selected to result in a composite containing, on an elemental basis, about 0.01 to about 10 wt. percent molybdenum and about 0.1 to about 15 wt. percent cobalt.

Other objects and embodiments of the present invention include specific details about particular oxysulfur compounds that can be reduced thereby, preferred amounts and sources for the hydrogen reducing agent, particularly preferred reduction conditions for use therein, preferred catalysts for use therein and particularly beneficial flow schemes for use therewith. All of these facets of the present invention are hereinafter disclosed in the following detailed description of the essential and preferred features of the instant method.

One reactant for the method of the present invention is a water-soluble oxysulfur compound. As previously explained the use of the term "oxysulfur compound" is intended to cover the common inorganic, water-soluble compound of oxygen and sulfur that are prevelant in modern day industry. It is intended to include within the scope of this term all compounds of oxygen and sulfur that are soluble in water and are capable of being reduced by hydrogen in the presence of a metallic sulfide-containing catalyst. One kind of oxysulfur compound that is included within this definition are the water-soluble inorganic sulfite compounds. These include sulfurous acid, ammonium sulfite and bisulfite, the alkali metal sulfites and bisulfites, the alkaline earth metal sulfites and bisulfites and the like sulfites. Another class of oxysulfur compounds suitable for use herein are the inorganic, water-soluble thiosulfate compounds such as ammonium thiosulfate, the alkali metal thiosulfate, the alkaline earth metal thiosulfate and the like thiosulfates. Typically, excellent results are obtained when the oxysulfur compound is ammonium thiosulfate or sodium thiosulfate. Yet another class of oxysulfur compounds which can be treated by the method of the present invention are the inorganic polythionic compounds such as the polythionic acids (i. e. $H_2S_nO_6$ where $n$ may have a value from 2 to 6 inclusive) the ammonium polythionates, the alkali metal polythionates, the alkaline earth metal polythionates and the like salts of the polythionic acids. Still another large class of compounds of sulfur and oxygen that are included within the scope of the oxysulfur compounds are the water-soluble, inorganic sulfate compounds. These last compounds are, in general, very difficult to treat by the method of the present invention unless the pH of the solution containing them is adjusted to a very low level such that free sulfuric acid would be present in the solution. That is, the only sulfate compound that is readily amenable to treatment by the present invention is sulfuric acid. Ordinarily, best results are obtained when the oxysulfur compound is either a sulfite compound or a thiosulfate compound.

As indicated above, it is an essential feature of the instant method that the oxysulfur compound is charged thereto in an aqueous solution. The amount of oxysulfur compound contained in this solution can range from relatively small amounts up to the solubility limit of the particular oxysulfur compound in water at the conditions utilized in the present method. Typically, the amount of oxysulfur compound contained in the input aqueous solution will be sufficient to constitute about 0.1 to about 30 wt. percent of the solution. For example, excellent results have been obtained with the present method when an aqueous solution containing about 20 wt. percent of sodium thiosulfate is charged thereto.

The other essential reactant for the present invention is hydrogen. The hydrogen stream for use herein may be obtained from any suitable source or may be prepared in any suitable manner. In addition, it may comprise substantially pure hydrogen or a mixture of hydrogen with other relatively inert gases, such as a mixture of hydrogen and nitrogen, a mixture of hydrogen and steam, a mixture of hydrogen with carbon dioxide or carbon monoxide and the like gaseous streams. One acceptable type of hydrogen stream for use herein is obtained by a controlled partial combustion of a hydrocarbon stream, such as a naphtha stream, a natural gas stream, a heavy fuel oil stream and the like hydrocarbon streams, in a non-catalytic reaction with air or pure oxygen at relatively high temperatures of 1,000° to 3,000° or more ° F. and a pressure of about 1 to about 20 atmospheres or more. Another acceptable source for a hydrogen stream is the excess recycle gas obtained from the various hydrocarbon conversion processes which have a net hydrogen make such as a reforming process, a dehydrogenation process and the like. Yet another common source for an acceptable hydrogen stream is a catalytic steam reforming reaction between a hydrocarbon stream, selected from the light naphthas, natural gas streams, propane streams, LPG streams and the like, and steam. This reaction typically involves use of a nickel-containing catalyst at temperatures of 1,000° to 2,000° F. and a pressure of 5 to 50 atmospheres coupled with a suitable CO to $CO_2$ shift reaction step. Of course, a relatively pure hydrogen stream can be easily prepared by an electrolysis procedure if desired. Least preferred of the available commercial sources of hydrogen stream is a stream produced by gasification of a solid carbonaceous material with oxygen or steam; however, such a stream can be utilized if absolutely necessary.

The amount of hydrogen charged to the current method is preferably sufficient to provide at least the stoichiometric amount of hydrogen necessary to reduce all of the sulfur component of the oxysulfur compound to the sulfide state. For example, when the oxysulfur compound is a thiosulfate compound, this stoichiometric amount is 4 moles of $H_2$ per mole of thiosulfate. Likewise, when the oxysulfur compound is a sulfite compound the stoichiometric amount necessary to reduce sulfite to sulfide is three moles of hydrogen per mole of sulfite compound. In all cases, it is preferred to operate with an amount of hydrogen which is substantially in excess of this minimum value—especially about 1.5 to about 10 times this minimum value. For example, when the oxysulfur compound is a thiosulfate compound, it is preferred to use about 6 to about 40 moles of hydrogen per mole of thiosulfate. It is, of course, understood that in the preferred case where excess hydrogen is utilized, unreacted hydrogen present in the effluent from the reduction step can be easily separated therefrom in a suitable gas-liquid separating zone and recycled through suitable compressive means to supply at least a portion of the necessary hydrogen for the reduction reaction.

An essential feature of the present invention involves the use of a catalyst comprising a combination of catalytically effective amounts of a group VIB metallic sulfide component and of a group VIII metallic sulfide component with a porous carrier material. Considering first the porous carrier material, it is preferred that the material be a porous adsorptive high surface area support having a surface area of about 100 to about 1,000 or more $m^a/g$. The porous carrier material should be relatively refractory to the conditions utilized in the reduction zone and it is intended to include within the scope of the present invention, carrier materials which have traditionally been utilized to support transition metals in catalysis such as: (1) activated carbon, coke, or charcoal; (2) silica or silica gel, silicon carbide, clays, and silicates including those synthetically prepared and naturally occurring, which may or may not be acid treated — for example, attapulgus clay, china clay, diatomaceous earth, fuller's earth, kaolin, kieselguhr, etc.; (3) ceramics, porcelain, crushed firebrick, bauxite; (4) refractory inorganic oxides such as alumina, tintanium dioxide, zirconium dioxide, chromium oxide, zinc oxide, magnesia, thoria, boria, silica-alumina, silica-magnesia, alumina-boria, silica-zirconia, etc.; (5) crystalline aluminosilicate such as naturally occurring or synthetically prepared mordenite and/or faujasite, either in the hydrogen form or in a form which has been treated with multivalent cations; and, (6) combination of one or more elements from these groups.

One preferred class of porous carrier materials for use in the present invention are relatively carbonaceous materials such as activated carbons, the various types of charcoal, coke and refractory inorganic oxides having carbonaceous material deposited thereon. An example of this last type of carrier material is a refractory inorganic oxide which has seen service in a hydrocarbon conversion reaction until it has 5 to 30 percent or more wt. percent carbon deposited thereon. Within this class of preferred carbonaceous carrier materials, best results are ordinarily obtained when the carrier material is an activated carbon. These activated carbon carrier materials are commercially available under the trade names of Norit, Nuchar, Darco, and the like. Of course, any similar activated carbon material known to those skilled in the art can also be utilized in the present catalyst. Especially preferred activated carbon carrier materials have an apparent bulk density of about 0.1 to about 1 g/cc and surface area characteristics such that the average pore diameter is about 10 to 1,000 Angstroms, the pore volume is about 0.1 to about 1 cc/g and the surface area is about 100 to about 1,000 or more $m^2/g$. In general, excellent results are typically obtained with an activated carbon carrier material (e. g. a Darco activated carbon) with a relatively small particle size (e. g. about 10 to about 30 mesh U.S. standard sieve size) having an apparent bulk density of about 0.43 g/cc, a pore volume of about 0.518 g/cc and a surface area of about 800 to about 1,100 $m^2/g$. In addition, the most preferred activated carbon carrier materials for use in the present catalyst are the ones that are classified as having a strong affinity for water; that is, the ones that are lyophilic.

Another preferred class of porous carrier materials are the refractory inorganic oxides, with alumina being most preferred among these. Suitable alumina carrier materials are the transition aluminas known as gamma- ,eta-, and theta- alumina. A gamma-alumina carrier material ordinarily is the best of these. In general, excellent results are obtained with a gamma-alumina carrier material which is used in the form of relatively small particles (typically about one-sixteenth inch in diameter) having an apparent bulk density of about 0.5 g/cc, a pore volume of about 0.5 cc/g and a surface area of about 175 $m^2/g$.

The first metallic sulfide component of the catalyst used in the method of the present invention is selected from the group VIB metallic sulfide compounds; that is the sulfides of the group VI transition metals of the Periodic Table. Included within the scope of this characterization are the sulfide compounds of chromium, molybdenum, tungsten and mixtures thereof. The preferred group VIB component is molybdenum sulfide. Although this component may initially exist within the catalyst in a form other than the sulfide form such as the oxide, halide, oxyhalide, elemental metal and the like, it very rapidly becomes sulfided during use in the present reduction reaction and is, consequently, referred to herein as being in the sulfide state. As indicated hereafter, it is preferred to prepare the catalyst so that the group VIB metallic component is initially present as the metallic sulfide. This component can be utilized in any amount which is catalytically effective, with the amount typically being selected so that the final catalyst contains about 0.01 to about 10 wt. percent of this component, calculated on an elemental metal basis. A particularly preferred catalyst, for example, would contain, on an elemental basis, about 0.5 to about 5 wt. percent molybdenum.

This group VI transition metal component may be incorporated in the final composition in any suitable manner and at any stage in the preparation thereof. One method involves impregnation of the porous carrier material with a suitable solution of the group VI transition metal. Another method is the ion-exchange method in which a solution of a suitable compound of the group VI transition metal, wherein the metal is present as an exchangeable ion, is contacted with the carrier material. Still another method involves cogellation or coprecipitation of the group VIB component with the carrier material when it is a refractory inorganic oxide. The preferred method involves impregnation of the carrier material with a solution containing the group VI transition metal; for example, excellent results are obtained by impregnating with an aqueous solution of suitable group VIB salts such as ammonium tungstate, sodium tungstate, molybdenum tetrabromide, molybdic acid, chromium dibromide, chromium dichloride, chromium nitrate, sodium chromate, ammonium molybdate, etc. — typically followed by conventional drying and calcination steps. This component may be added before during or after the addition of the group VIII metallic sulfide component, with best results typically obtained with sequential impregnation steps which are separated by a sulfiding treatment. For example, in the case of the preferred molybdenum sulfide- and cobalt sulfide-containing catalyst, excellent results are obtained by impregnating the carrier material first with cobalt acetate, then drying and treating the resulting cobalt-impregnation material with $H_2S$ until an equilibrium condition is established, thereafter, in a second impregnation step, adding the molybdenum component by means of an impregnation solution containing molybdic acid and finally drying and treating once again with sulfide.

The second metallic sulfide component of the catalyst of interest here is selected from the group VIII sulfide compounds; that is the sulfide compounds of the group VIII transition metals of the Periodic Table. Included within the scope of this classification are the sulfide compounds of the iron group metals (i. e. iron, cobalt, and nickel) and the platinum group metals (i.e. platinum, iridium, osmium, palladium, rhodium and ruthenium). Best results are ordinarily obtained when this second metallic sulfide component is an iron group metallic sulfide, and the most preferred iron group metallic sulfide is cobalt sulfide. As was the case with the first metallic sulfide component, this component may initially exist with the catalyst as a nonsulfide compound or as the elemental metal, with transition to the sulfide compound occurring during the first portion of the reduction reaction. In general, this second metallic sulfide component may be utilized in any amount which is catalytically effective; ordinarily, satisfactory results are obtained with a catalyst containing, on an elemental basis, about 0.1 to about 15 wt. percent of the group VIII metal. For example, excellent results are obtained when the catalyst contains about 1 to about 10 wt. percent of an iron group metal in the form of the metallic sulfide.

This group VIII transition metal component may be incorporated in the catalyst in any suitable manner and in any stage of the preparation of this catalyst. One method involves impregnation of the porous carrier material with a suitable solution of a group VIII transition metal, another method involves cogellation or coprecipitation of the group VIII component with a carrier material when it is a refractory inorganic oxide. The preferred method involves impregnation of the carrier material with an aqueous solution containing a water-soluble, decomposable group VIII metal-containing compound such as iron acetate, iron bromide, iron chloride, iron nitrate, iron oxalate, iron sulfate, cobalt acetate, cobalt bromide, cobalt chloride, cobalt nitrate, cobalt sulfate, nickel bromide, nickel perchlorate, nickel chloride, nickel formate, nickel nitrate, nickel sulfate, ammonium chloroplatinate, chloroplatinic acid, bromoplatinic acid, platinum dichloride, palladium chloride, palladium sulfate, palladium nitrate and the like compounds. Like the previous metallic sulfide component, this component may be added before, during or after the addition of the other metallic sulfide component, with best results ordinarily obtained by sequential impregnation with an intervening sulfide treatment. For example, in the more preferred case where the group VIII metallic sulfide component is cobalt sulfide, excellent results are obtained with a two-step impregnation procedure separated by an intervening sulfide treatment as was previously disclosed in connection with the first metallic sulfide component.

Regarding the relative amounts of the metallic components of the present catalyst, I have found it to be a good practice to specify the amount of the group VII component as a function of the amount of the group VIB component. On this basis, the amounts of the group VIII and the group VIB components should ordinarily be selected from the ranges previously given so that the atomic ratio of group VIII metal to group VIB metal contained in the catalyst is about 0.25:1 to about 5:1. For example, in the case of the preferred cobalt sulfide— and molybdenum sulfide-containing catalyst, the amounts of cobalt and molybdenum are preferably selected so that the atomic ratio of cobalt to molybdenum is about 0.25 : 1 to about 5:1.

Regardless of the details of how the metallic sulfide components are combined with the porous carrier material the final catalyst generally will be dried at a temperature of about 200° to 600° F. for a period of 2 to about 24 hours or more. In the case where the porous carrier material is a refractory inorganic oxide, the resulting dried composite can be further oxidized or calcined in an air atmosphere at a temperature of about 700° to about 1,100° F. for an additional period of about 0.5 to about 10 hours. In the case where the porous carrier material is a carbonaceous material, this calcination step is not essential, and if its performed, it should be done in an inert environment such as in the presence of nitrogen. In either case, it is a distinctly preferred practice to subject the resulting catalyst to a sulfiding step prior to its use in the present method, in order to insure that both metallic components are in the sulfide state. Preferably, this presulfiding treatment takes place in the presence of a suitable decomposable sulfur-containing compound such as lower molecular weight mercaptans, hydrogen sulfide, organic sulfides and the like. Typically, the sulfiding procedure involves contacting the dried catalyst with the sulfur-containing reactant at conditions sufficient to effect the desired incorporation of sulfur generally including a temperature of about 50° to about 1,100° F. It is to be noted that the preferred catalyst preparation procedure involves sequential impregnation of the metallic sulfide component with a sulfide treatment of the resulting catalyst after each impregnation step.

Although the sulfiding treatment may be conducted according to any of the procedures known to the art, I have found that the preferred technique involves using a $H_2S$-containing gas to quench a vacuum about the catalyst. That is, this technique involves establishing a vacuum in a closed vessel containing the catalyst and thereafter injecting $H_2S$-containing gas into the vessel to return same at least to atmospheric pressure. The pressure in the vessel during the first portion of this procedure should be less than 0.2 atoms and preferably less than 0.05 atoms. This technique may be separated, if desired, until the catalyst doesn't absorb any further amounts of $H_2S$.

The principal advantage associated with the use of this bimetallic catalyst in the method of the present invention is its increased activity for accelerating the reaction between hydrogen and the oxysulfur compound. This relatively high activity allows the reduction reaction to be conducted at conditions which are relatively low in severity, thereby effecting savings in utilities associated with the reduction method such as cost of heat generation, hydrogen compression costs and the like costs. In addition, this bimetallic catalyst mainfests a rather high selectivity for the corresponding sulfide compound, thereby limiting the yield of undesired by-products. For example, a catalyst comprising molybdenum sulfide and cobalt sulfide combined with an activated carbon carrier material in an amount sufficient to result in a composite containing, on an elemental basis, 2.3 wt. percent molybdenum and 4.6 wt. percent cobalt at 150° C. achieved 100 percent conversion of sodium thiosulfate at a selectivity for sulfide of 97 percent.

According to the method of the present invention, the aqueous solution containing the oxysulfur compound and the hydrogen stream are contacted with this bimetallic catalyst at reduction conditions. The instant reduction method can be carried out in any suitable manner and in either a batch or continuous type operation. In a batch system, the aqueous solution containing the oxysulfur compound is charged to a reaction zone which is thereafter charged with the desired amount of hydrogen. The catalyst is mixed with the reactants in the reaction zone and agitation and heat is supplied to the zone in order to initiate the desired reaction. In a continuous type system the oxysulfur-containing aqueous stream is passed into the reaction zone in either upward, radial or downward flow with a hydrogen stream being simultaneously charged to the reaction zone in either concurrent or countercurrent flow relative to the aqueous stream. In particular, a preferred embodiment of the instant method involves concurrent flow of the aqueous stream and the hydrogen stream into a reaction zone containing the previously characterized bimetallic catalyst. Although any of the modes of operation known to the art for using a solid catalyst can be utilized in the present invention including a moving bed system or a fluidized bed type system, the preferred procedure involves maintaining the catalyst within the reaction zone as a fixed bed of relatively small particles. Typically, good results are obtained when the particle size is 10 to 30 mesh (U.S. standard sieve series).

In the preferred concurrent flow embodiment, the effluent stream withdrawn from the reaction zone primarily contains the sulfide product of the reduction reaction, a minor amount of unreacted oxysulfur compound, unreacted hydrogen and water. The hydrogen is typically separated from the aqueous effluent stream in a conventional separating zone, and the resulting hydrogen stream recycled through a suitable compressing means to the reaction zone. If desired, the sulfide product may be stripped from the resulting aqueous effluent stream via a suitable stripping agent such as by injecting the sulfide-containing solution into a stripping column and utilizing steam or any other suitable stripping gas to remove hydrogen sulfide overhead with recovery of substantially sulfide-free aqueous solution from the bottom of the stripping column. The hydrogen sulfide-containing overhead stream may then be processed by conventional techniques to recover sulfur, to produce sulfuric acid or to make any other desired sulfur product. The aqueous solution withdrawn from the bottom of this stripping column then may be discharged or disposed of in any suitable manner without causing any substantial waste disposal problem since it has only a relatively small biological oxygen demand. In some cases the aqueous effluent stream containing the sulfide compound can be directly used in further processing or it can be returned to the process which originally produced the oxysulfur-containing input stream to the present method.

The reduction conditions utilized in the method of the present invention are generally characterized as reduction conditions effective to convert oxysulfur compounds to the corresponding sulfide compound. The reaction temperature is preferably selected from the range of about 50° to about 350° C., with a preferred value being about 75° to 200° C. The pressure utilized should be sufficient to maintain at least a portion of the input aqueous solution in the liquid phase. In general, a pressure above this minimum pressure is preferred because I have noted that the extent of conversion increases with increasing pressure. However, the use of an extremely high pressure is relatively costly, accordingly, pressures of about 100 to about 3,000 psig. are preferred. In a batch embodiment of the present method, the contact time utilized is preferably about one-half to about 5 hours, with best results obtained at 0.75 to about 2.5 hours. In a continuous process, it is preferred to use a LHSV (defined on the basis of the charge rate of the input solution divided by the volume of the catalyst bed) in the range of about 0.25 to about 10 hrs.$^{-1}$, with best results obtained at about 0.5 to about 3 hrs.$^{-1}$.

The following examples are given to illustrate further the preferred mode of operation and utility of the present invention. These examples are intended to be illustrative rather than restrictive.

EXAMPLE I

In order to demonstrate the beneficial effect of the previously described bimetallic catalyst, three catalysts were prepared. Catalyst "A" was a combination of molybdenum sulfide with a Darco carbon carrier material in an amount such that the catalyst contained on an elemental basis, 2.1 wt. percent molybdenum. Catalyst "A" was prepared by impregnating a 10 to 30 mesh particle of a Darco carbon carrier material with molybdic acid, drying the resulting impregnated carrier and thereafter sulfiding with hydrogen sulfide at room temperature. Catalyst "B" was a combination of cobalt sulfide with a Darco carrier materials in amounts sufficient to result in a catalyst containing 4.6 wt. percent cobalt. Catalyst "B" was prepared by a procedure similar to that used for Catalyst "A" except the impregnation solution contained cobalt acetate rather than molybdic acid. Catalyst "C," the catalyst of the present invention, was a combination of molybdenum sulfide and cobalt sulfide with Darco carbon in an amount sufficient to result in a catalyst containing, on an elemental basis, 2.3 wt. percent molybdenum and 4.6 wt. percent cobalt. Catalyst "C" was prepared by impregnating the 10 to 30 mesh particles of Darco carrier material with cobalt acetate at room temperature, drying the resulting impregnated carrier material and treating the resulting dried material with hydrogen sulfide at room temperature, thereafter impregnating the sulfided carrier material with an aqueous solution of molybdic acid, drying as before and treating with hydrogen sulfide in order to convert the molybdenum to molybdenum sulfide. The atomic ratio of cobalt to molybdenum in catalyst "C" was 3.5:1.

The resulting catalyst were utilized in a series of test to determine their relative activity for the reduction of an aqueous solution of an oxysulfur compound with hydrogen. In this test, the input aqueous solution was an aqueous solution of sodium thiosulfate containing 9.08 wt. percent sulfur in the form of thiosulfate. The comparison tests were all made in a pilot plant wherein each catalyst was loaded into a conventional reaction zone and the mixture of aqueous solution and hydrogen stream was passed downflow into the reaction zone. The conditions utilized in this test were a pressure of 500 psig., a LHSV of 1 hrs.$^{-1}$ and a mole ratio of hydrogen to sodium thiosulfate of 4:1. The reaction temperatures utilized in each run are given in the following Table I. Each test run consisted of an 8 hour lineout period and an 8 hour test period. The results of these comparison runs are presented in Table I in terms of reaction temperature utilized, percent of sodium thiosulfate charged to the reactor that was converted therein and selectivity for sulfide expressed as percent of converted thiosulfate which went to sulfide—typically sodium sulfide or sodium hydrosulfide.

TABLE I

| Run No. | Catalyst | Inlet Reactor Temp. °C. | Conversion % | Selectivity % |
|---|---|---|---|---|
| 1 | A | 168 | 20 | |
| 2 | B | 170 | 100 | |
| 3 | B | 150 | 58 | |
| 4 | B | 129 | 26 | |
| 5 | C | 173 | 99 | 99 |
| 6 | C | 150 | 100 | 99 |
| 7 | C | 128 | 70 | 98 |

With reference now to Table I, it can be seen that Catalyst "A" produced very poor results with a reaction temperature of 170° C. Since reaction temperatures required to achieve a given conversion is a sensitive indicator of catalyst activity, it is apparent that Catalyst "A" was relatively inactive for the desired reduction reaction. Likewise, Catalyst "B" was relatively inactive although it did much better than Catalyst "A." Specifically, Catalyst "B" achieved a 58 percent conversion at 150° C. and a 26 percent conversion at 129° C. In sharp contrast, Catalyst "C," the catalyst of the present invention, possessed high activity for the desired conversion reaction at both 150° and 128° C. The results for these last two temperatures are a conversion of 100 percent at 150° C. at a selectivity for sulfide of 99 percent, and a conversion of 70 percent of thiosulfate at 128° C. at a selectivity for sulfide of 98 percent.

These results manifest the surprising increase in activity for the desired reduction reaction which is achieved by means of the preferred bimetallic catalyst of the present invention.

EXAMPLE II

The catalyst utilized is a combination of tungsten sulfide and iron sulfide with a carbonaceous carrier material in amounts sufficient to result in a composite containing on an elemental basis, 5 wt. percent iron and 3 wt. percent tungsten. The input aqueous stream is a solution of sodium bisulfite containing 5 wt. percent sulfur as $NaHSO_3$. The reaction conditions utilized in an experiment similar to that described in Example 1 are: an inlet reactor temperature of 175° C., a pressure of 750 psig., a LHSV of 1 hrs.$^{-1}$, and a hydrogen to sulfide mole ratio of 10:1. Results of a ten hour test period indicate that a major portion of the sodium sulfite is converted to sodium hydrosulfide.

EXAMPLE III

The catalyst is a combination of chromium sulfide and nickel sulfide with a gamma-alumina carrier material in amounts sufficient to result in a composite containing, on an elemental basis, 2 wt. percent chromium and 5 wt. percent nickel. The input aqueous solution contains about 5 wt. percent sulfur in the form of ammonium trithionate ( i. e. $(NH_4)_2S_3O_6$). The conditions utilized in an experiment similar to that described in Example I are: an inlet reactor temperature of 200° C., a pressure of 500 psig., a LHSV of 1.5 hrs.$^{-1}$ and a hydrogen to trithionate mole ratio of 6:1. Results indicate good conversion of the ammonium trithionate at a relatively high selectivity for ammonium hydrosulfide.

It is intended to cover by the following claims all changes and modifications of the above disclosure of the present invention that would be self-evident to a man of ordinary skill in the catalytic water-treating art.

I claim as my invention:

1. A method for reducing an inorganic, water-soluble oxysulfur compound to a sulfide compound, which comprises contacting an aqueous solution of said oxysulfur compound and hydrogen with a catalyst, comprising a combination of catalytically effective amounts of a group VIB metallic sulfide component and of a group VIII metallic sulfide component with a porous carrier material, at a temperature of from about 50° to about 350° C. and a pressure of about 100 to about 3,000 psig.

2. A method as defined in claim 1 wherein said oxysulfur compound is a water-soluble, inorganic sulfite compound.

3. A method as defined in claim 2 wherein said sulfite compound is selected from the group consisting of the sulfites and bisulfites of ammonia, the alkali metal and the alkaline earth metals.

4. A method for reducing an inorganic water soluble thiosulfate compound to a sulfide compound, which comprises contacting an aqueous solution of said thiosulfate compound and hydrogen with a catalyst, comprising a combination of catalytically effective amounts of a Group VIB metallic sulfide component and of a Group VIII metallic sulfide component, with a carbonaceous carrier material, at a temperature of from about 50° to about 350° C. and a pressure of about 100 to about 3,000 psig.

5. A method as defined in claim 4 wherein said thiosulfate compound is selected from the group consisting of ammonium thiosulfate, the alkali metal thiosulfates and the alkaline earth metal thiosulfates.

6. A method as defined in claim 5 wherein said thiosulfate compound is sodium thiosulfate.

7. A method as defined in claim 5 wherein said thiosulfate compound is ammonium thiosulfate.

8. A method as defined in claim 1 wherein said oxysulfur compound is a water-soluble, inorganic polythionic compound.

9. A method as defined in claim 1 wherein said group VIB metallic sulfide component of said catalyst is molybdenum sulfide.

10. A method as defined in claim 1 wherein said group VIII metallic sulfide component of said catalyst is cobalt sulfide.

11. A method as defined in claim 1 wherein said porous carrier material is a carbonaceous material.

12. A method as defined in claim 11 wherein said carbonaceous material is activated carbon.

13. A method as defined in claim 1 wherein said porous carrier material is a refractory inorganic oxide.

14. A method as defined in claim 13 wherein said refractory inorganic oxide is alumina.

15. A method as defined in claim 4 wherein the Group VIB metallic sulfide component is molybdenum sulfide, and the Group VIII metallic sulfide component is cobalt sulfide.

16. A method as defined in claim 15 wherein said thiosulfate compound is ammonium thiosulfate.

17. A method as defined in claim 15 wherein said thiosulfate compound is sodium thiosulfate.

18. A method as defined in claim 15 wherein the porous carrier material is activated carbon.

19. A method as defined in claim 15 wherein hydrogen is present in an amount corresponding to a mole ratio of hydrogen to said thiosulfate compound of about 6:1 to about 40:1.

20. A method as defined in claim 15 wherein said molybdenum sulfide component of the catalyst comprises about 0.01 to about 10 wt. percent thereof, calculated on an elemental molybdenum basis.

21. A method as defined in claim 15 wherein the cobalt sulfide component of the catalyst comprises about 0.1 to about 15 wt. percent thereof, calculated on an elemental cobalt basis.

22. A method as defined in claim 15 wherein the amounts of the cobalt sulfide component and the molybdenum sulfide component contained in the catalyst are selected to result in an atomic ratio of cobalt to molybdenum of about 0.25:1 to about 5:1.

23. A method as defined in claim 15 wherein said reduction conditions include a temperature of about 50° to about 350° C. and a pressure at least sufficient to maintain a portion of the aqueous solution in the liquid phase.

* * * * *